(12) United States Patent
Bajpai et al.

(10) Patent No.: US 11,741,463 B2
(45) Date of Patent: Aug. 29, 2023

(54) LEAKAGE DETECTION SYSTEM

(71) Applicant: AMERICAN EXPRESS TRAVEL RELATED SERVICES COMPANY, INC., New York, NY (US)

(72) Inventors: Ravi Bajpai, Noida (IN); Shashank Chauhan, Gurugram (IN); Srikanth Reddy Dorla, Gurugram (IN); Tushar Gupta, Delhi (IN); Vishal Jain, Gurugram (IN); Khushboo Kumar, Delhi (IN); Harmeet Sachdeva, Delhi (IN); Tarun Sehgal, New Delhi (IN); Anshul Sharma, Gurugram (IN); Sonal Surana, Gurugram (IN); Dipti Verma, Noida (IN)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

(21) Appl. No.: 16/182,842

(22) Filed: Nov. 7, 2018

(65) Prior Publication Data

US 2020/0090171 A1 Mar. 19, 2020

(30) Foreign Application Priority Data

Sep. 13, 2018 (IN) .............................. 201811034510

(51) Int. Cl.
*G06Q 40/00* (2023.01)
*G06Q 20/40* (2012.01)
(Continued)

(52) U.S. Cl.
CPC ........... *G06Q 20/40* (2013.01); *G06Q 20/085* (2013.01); *G06Q 30/018* (2013.01)

(58) Field of Classification Search
CPC ....................................................... G06Q 20/40
See application file for complete search history.

(56) References Cited

U.S. PATENT DOCUMENTS

| 2002/0130176 | A1* | 9/2002 | Suzuki | .................... | H04W 4/02 |
| | | | | | 235/380 |
| 2012/0209640 | A1* | 8/2012 | Hamper | ................. | G06Q 10/10 |
| | | | | | 705/5 |

(Continued)

OTHER PUBLICATIONS

Ingram, David (What Are the Seven Internal Control Procedures in Accounting?, Chron, https://smallbusiness.chron.com/seven-internal-control-procedures-accounting-76070.html, Jan. 2019) (Year: 2019).*

*Primary Examiner* — Elizabeth H Rosen
*Assistant Examiner* — Mark H Gaw
(74) *Attorney, Agent, or Firm* — Thomas | Horstemeyer, LLP

(57) ABSTRACT

The system may be configured to perform operations including receiving a transaction history comprising transaction information associated with a plurality of transactions for an entity; analyzing transaction information associated with a transaction of the plurality of transactions; and detecting a leakage event associated with the transaction. Detecting the leakage event may comprise determining a payment method for the transaction in response to the analyzing the transaction information; and comparing the payment method to a desired payment method, wherein the leakage event is detected in response to the payment method differing from the desired payment method.

17 Claims, 2 Drawing Sheets

(51) Int. Cl.
    *G06Q 30/018*    (2023.01)
    *G06Q 20/08*     (2012.01)

(56) References Cited

U.S. PATENT DOCUMENTS

2017/0132716 A1* 5/2017 Khandanyan .......... G06Q 40/12
2017/0337480 A1* 11/2017 Yin ....................... H04L 67/535

* cited by examiner

LEAKAGE DETECTION SYSTEM

CROSS REFERENCE TO RELATED APPLICATIONS

This application claims priority to and the benefit of Indian Patent Application No. 201811034510, filed Sep. 13, 2018 and entitled "Leakage Detection System," which is incorporated by reference herein in its entirety for all purposes.

FIELD

The present disclosure generally relates to analyzing transactions to detect compliance with an entity's spending rules or spending policy, and more particularly, compliance with the use of a desired payment method.

BACKGROUND

Companies often have spending policies or rules dictating to employees what types of transactions they may conduct with company funds or for which they may seek reimbursement (e.g., for travel and entertainment). Business transactions may require completion via a certain payment method as dictated by the company to allow the company to receive the best price or benefits resulting from the company expenses. However, it may be difficult to detect employees failing or unable to comply with the spending policy, and the reason for such noncompliance, where determination of the reason for failed or unfeasible compliance may be a useful preventative measure.

SUMMARY

A system, method, and article of manufacture (collectively, "the system") are disclosed relating to a transaction compliance scoring system. In various embodiments, the system may be configured to perform operations including receiving, by a processor, a transaction history comprising transaction information associated with a plurality of transactions for an entity; analyzing, by the processor, transaction information associated with a transaction of the plurality of transactions; and/or detecting, by the processor, a leakage event associated with the transaction. The detecting the leakage event may comprise determining, by the processor, a payment method for the transaction in response to the analyzing the transaction information; and/or comparing, by the processor, the payment method to a desired payment method. The leakage event may be detected in response to the payment method differing from the desired payment method.

In various embodiments, detecting the leakage event may further comprise determining, by the processor, a transaction purpose of the transaction, wherein the leakage event is detected in further response to the transaction purpose determined as a business purpose. In various embodiments, detecting the leakage event may further comprise analyzing, by the processor, merchant information associated with a merchant in the transaction, wherein the merchant information is comprised in the transaction information associated with the transaction; and/or determining, by the processor, the inadequacy of the merchant information to identify the merchant, wherein a merchant identifier is at least one of missing from the merchant information or the merchant information is insufficient to identify the merchant. A leakage event may be detected in further response to the determined inadequacy of the merchant information.

In various embodiments, detecting the leakage event may further comprise analyzing, by the processor, merchant information associated with a merchant in the transaction, wherein the merchant information is comprised in the transaction information associated with the transaction; matching, by the processor, a merchant identifier comprised in the merchant information with stored merchant information associated with a stored merchant; identifying, by the processor, the merchant associated with the transaction in response to the matching; and/or determining, by the processor, if the identified merchant accepts the preferred payment method. A leakage event may be detected in further response to the identified merchant one of accepting or not accepting the desired payment method. In various embodiments, detecting the leakage event may further comprise determining, by the processor, a confidence score in response to the matching the merchant identifier with stored merchant information; and comparing, by the processor, the confidence score to a confidence score threshold. Identifying the merchant associated with the transactions may be in response to the confidence score meeting or exceeding the confidence score threshold. In various embodiments, analyzing the merchant information may comprise determining, by the processor, accurate merchant information by at least one of translating at least a portion of a merchant name or filling in missing merchant information based on surrounding merchant information within the merchant information.

In various embodiments, detecting the leakage event may further comprise analyzing, by the processor, consumer information associated with a consumer in the transaction, wherein the consumer information is comprised in the transaction information associated with the transaction; matching, by the processor, a consumer identifier comprised in the consumer information with stored consumer information associated with a stored consumer; identifying, by the processor, the consumer associated with the transaction; and/or determining, by the processor, if the consumer has been issued a desired payment instrument to conduct the desired payment method to complete transactions. A leakage event may be detected further in response to at least one of consumer not having been issued the desired payment instrument or possession the desired payment instrument.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. Furthermore, any reference to singular includes plural embodiments, and any reference to more than one component may include a singular embodiment. Although specific advantages have been enumerated herein, various embodiments may include some, none, or all of the enumerated advantages.

Figure 1:
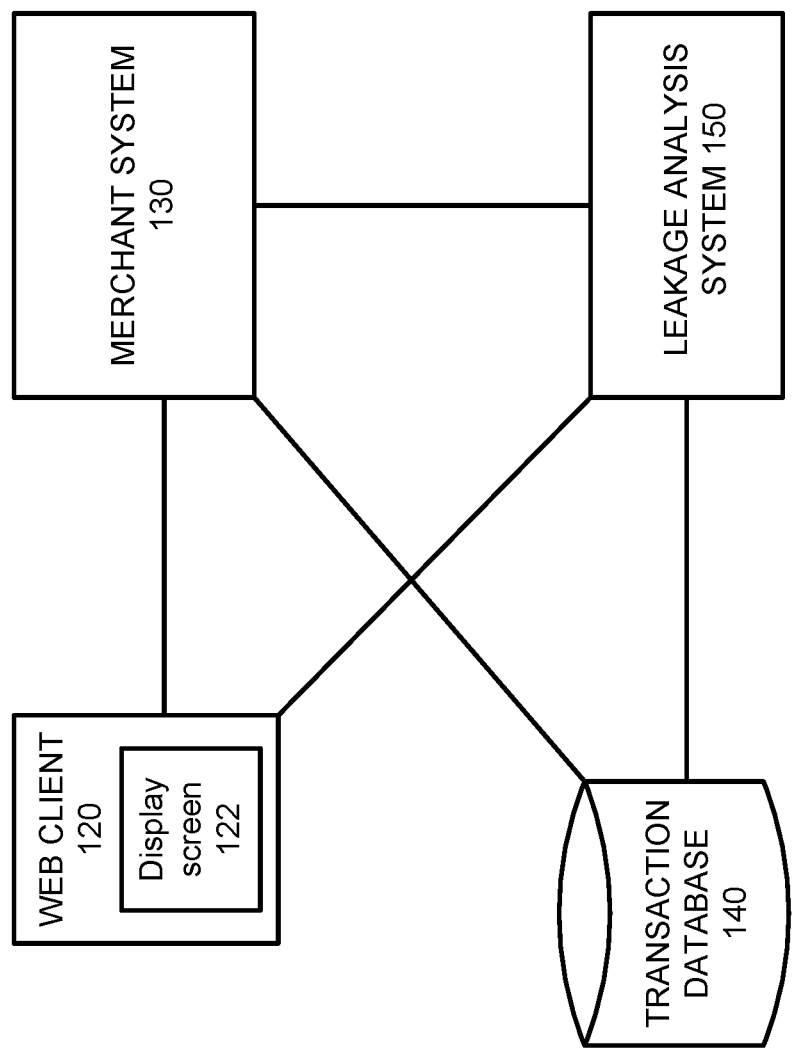
FIG. 1 depicts an exemplary leakage detection system, in accordance with various embodiments.

With reference to FIG. 1, an exemplary leakage detection system 100 is disclosed. In various embodiments, system 100 may comprise a web client 120, a merchant system 130, a transaction database 140, and/or a leakage analysis system 150. All or any subset of components of system 100 may be in communication with one another via a network. System 100, or any components comprised therein, may be computer-based, and may comprise a processor, a tangible non-transitory computer-readable memory, and/or a network interface. Instructions stored on the tangible non-transitory memory may allow system 100 to perform various functions, as described herein.

In various embodiments, web client 120 may incorporate hardware and/or software components. For example, web client 120 may comprise a server appliance running a suitable server operating system (e.g., MICROSOFT INTERNET INFORMATION SERVICES or, "IIS"). Web client 120 may be any device that allows a user to communicate with a network (e.g., a personal computer, personal digital assistant (e.g., IPHONE®, BLACKBERRY®), cellular phone, kiosk, and/or the like). Web client 120 may be in communication with merchant system 130 and/or leakage analysis system 150 via a network. Web client 120 may participate in any or all of the functions performed by merchant system 130 and/or leakage analysis system 150 via the network.

Web client 120 includes any device (e.g., personal computer) which communicates via any network, such as those discussed herein. In various embodiments, web client 120 may comprise and/or run a browser, such as MICROSOFT® INTERNET EXPLORER®, MOZILLA® FIREFOX®, GOOGLE® CHROME®, APPLE® Safari, or any other of the myriad software packages available for browsing the internet. For example, the browser may communicate with merchant system 130 via network by using Internet browsing software installed in the browser. The browser may comprise Internet browsing software installed within a computing unit or a system to conduct online transactions and/or communications. These computing units or systems may take the form of a computer or set of computers, although other types of computing units or systems may be used, including laptops, notebooks, tablets, handheld computers, personal digital assistants, set-top boxes, workstations, computer-servers, main frame computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. In various embodiments, the browser may be configured to display an electronic channel.

In various embodiments, a network may be an open network or a closed loop network. The open network may be a network that is accessible by various third parties. In this regard, the open network may be the internet, a typical transaction network, and/or the like. Network may also be a closed network. In this regard, network may be a closed loop network like the network operated by American Express. Moreover, the closed loop network may be configured with enhanced security and monitoring capability. For example, the closed network may be configured with tokenization, associated domain controls, and/or other enhanced security protocols. In this regard, network may be configured to monitor users on the network. In this regard, the closed loop network may be a secure network and may be an environment that can be monitored, having enhanced security features.

In various embodiments, merchant system 130 may be associated with a merchant, and may incorporate hardware and/or software components. For example, merchant system 130 may comprise a server appliance running a suitable server operating system (e.g., Microsoft Internet Information Services or, "IIS"). Merchant system 130 may be in communication with web client 120, transaction database 140, and/or leakage analysis system 150. In various embodiments, merchant system 130 may comprise an online store, which consumers may access through the browser on web client 120 to purchase goods or services from the merchant. In various embodiments, merchant system 130 may comprise point-of-sale terminals at a physical location for the merchant, at which consumers may complete transactions in-person using a transaction instrument (e.g., credit or debit card), or another payment method (e.g., cash).

In various embodiments, transaction database 140 may be associated with a transaction account issuer (an entity that issues transaction accounts to consumers, such as credit cards, bank accounts, etc.). Transaction database 140 may comprise hardware and/or software capable of storing data and/or analyzing information. Transaction database 140 may comprise a server appliance running a suitable server operating system (e.g., MICROSOFT INTERNET INFORMATION SERVICES or, "IIS") and having database software (e.g., ORACLE) installed thereon. Transaction database 140 may be in electronic communication with merchant system 130 and/or leakage analysis system 150. In various embodiments, transaction database 140 may comprise software and hardware configured to receive and store transaction information from transactions completed between at least two parties (e.g., merchants and consumers). Transaction information may include details and/or characteristics of the associated transaction(s), such as a transaction location, merchant information (e.g., merchant identifier, merchant type, merchant location, etc.), item purchased, monetary amount, date, time, payment method (e.g., cash, credit, electronic payment instrument (e.g., credit or debit card), gift card, frequent flyer miles, reward points, or the like), etc. The consumers involved in the transactions may be employees of a company, the company being a customer of a transaction account issuer. The company may desire to monitor and/or analyze business transactions conducted by its employees, and therefore utilize system 100 and/or leakage analysis system 150. By being a customer of a transaction account issuer, the company may receive benefits or rewards for conducting company transactions via a transaction instrument (e.g., a credit card) that was the issued by the associated transaction account issuer. Therefore, at least a portion of consumers involved in the transactions (i.e., employees of the company) may hold transaction accounts issued from the transaction account issuer that is associated with system 100 and/or leakage analysis system 150.

In various embodiments, consumers (i.e., employees of companies) may engage in transactions with merchant system 130 (representing multiple merchants with which the employees may transact). Transaction information associated with each transaction may be transmitted to transaction database 140 for storage. There may be a plurality of transactions and associated transaction information transmitted to and stored in transaction database 140. Transaction database 140 may receive transaction information from merchant system 130 and/or the transaction account issuer that issued the transaction instrument used in the transaction for payment. Such transaction information received directly from a participant in the transaction may be referred to as internal data. Transaction database 140 may also receive and store external transaction information from an external system, which collects transaction information associated with a plurality of transactions. For example, the external system may comprise the transaction information associated with transactions from a company's employees, the company being a customer of the transaction account issuer associated with system 100 and/or leakage analysis system 150. The external system may be, for example, a recording system and/or reimbursement system, which employees enter transaction information for business transactions in order to seek reimbursement from their employer.

In various embodiments, leakage analysis system 150 may comprise hardware and/or software capable of storing data and/or analyzing information. Leakage analysis system 150 may comprise a server appliance running a suitable server operating system (e.g., MICROSOFT INTERNET INFORMATION SERVICES or, "IIS") and having database software (e.g., ORACLE) installed thereon. Leakage analysis system 150 may be in electronic communication with web client 120, merchant system 130, and/or transaction database 140. In various embodiments, leakage analysis system 150 may be configured to analyze transactions, and transaction information associated therewith, to determine whether a consumer (e.g., an employee of a company, which is a customer of a transaction account issuer associated with system 100 and/or leakage analysis system 150) is complying with certain spending policy rules. Leakage analysis system 150 may receive the transaction information to analyze from transaction database 140.

Many companies (i.e., employers) often have a spending policy which dictates appropriate financial and transactional behavior of the company's employees in association with, for example, company expenses that are reimbursable expenses, approved merchants, merchant types, or the like. The spending policy for each company may include a preferred payment method, from which the company receives a certain benefit. For example, if a company has a business relationship with a transaction account issuer, the transaction account issuer may provide the company with a payment method (e.g., a transaction account with an associated transaction instrument), the use of which results in the company receiving benefits (e.g., rebates, discounts, reward points, or the like). Therefore, a company may implement a policy instructing its employees to conduct company spending (e.g., for travel, entertainment, equipment, or other business expenses) with the payment method provided by the transaction account issuer (i.e., the desired payment method). Accordingly, leakage analysis system 150 may be configured to detect leakage events, which is a transaction that is not paid for using the desired payment method. In other words, leakage comprises business transactions for which the desired payment method should have been used according to the company spending policy.

In various embodiments, leakage analysis system 150 may receive transaction information for a transaction in real time or near real time to analyze the transaction information and detect noncompliance. In various embodiments, leakage analysis system 150 may detect leakage events in real time or near real time relative to receipt of transaction information for analysis (i.e., leakage analysis system 150 may analyze received transaction information for leakage events immediately or nearly immediately in response to receipt of the transaction information). Thus, a company may identify potential spending policy noncompliance and leakage, and address leakage as transaction information is received and analyzed by leakage analysis system 150. For example, a company may receive transaction information for a transaction, and leakage analysis system 150 may receive the transaction information. In response, leakage analysis system 150 detect a leakage event and/or provide an action item for the company to take remedial action in response to the receipt of the transaction information. Such analysis of transaction information and detection of leakage events may take place in real time or near real time relative to when the transaction actually happens and/or relative to when leakage analysis system 150 receives the transaction information for analysis. Additionally, leakage analysis system 150 may receive instructions from a company using leakage analysis system 150 (e.g., giving instructions on what types of transaction characteristics or information may identify a leakage event, or the like), and leakage analysis system 150 may make an adjustment in real time or near real time to the analysis of transaction information accordingly.

The various components of system 100 may be independently, separately, or collectively suitably coupled to the network via data links which includes, for example, a connection to an Internet Service Provider (ISP) over the local loop as is typically used in connection with standard modem communication, cable modem, DISH NETWORK®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale, or distribution of any goods, services, or information over any network having similar functionality described herein.

Figure 2:
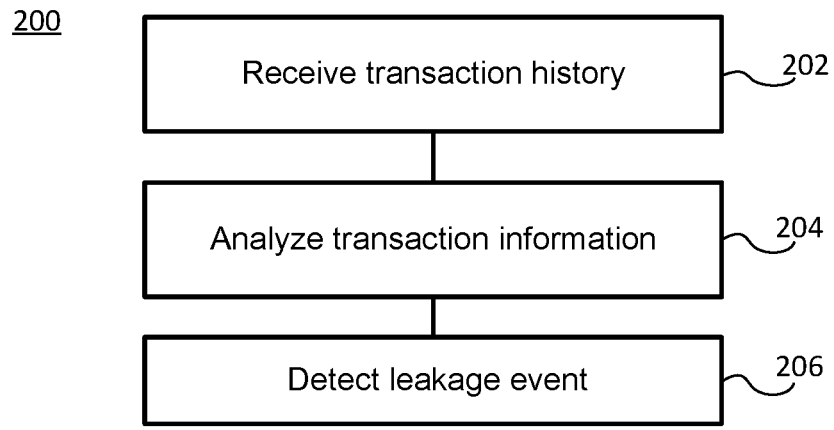
FIG. 2 depicts an exemplary method for utilizing a leakage detection system, in accordance with various embodiments.
Figure 3:
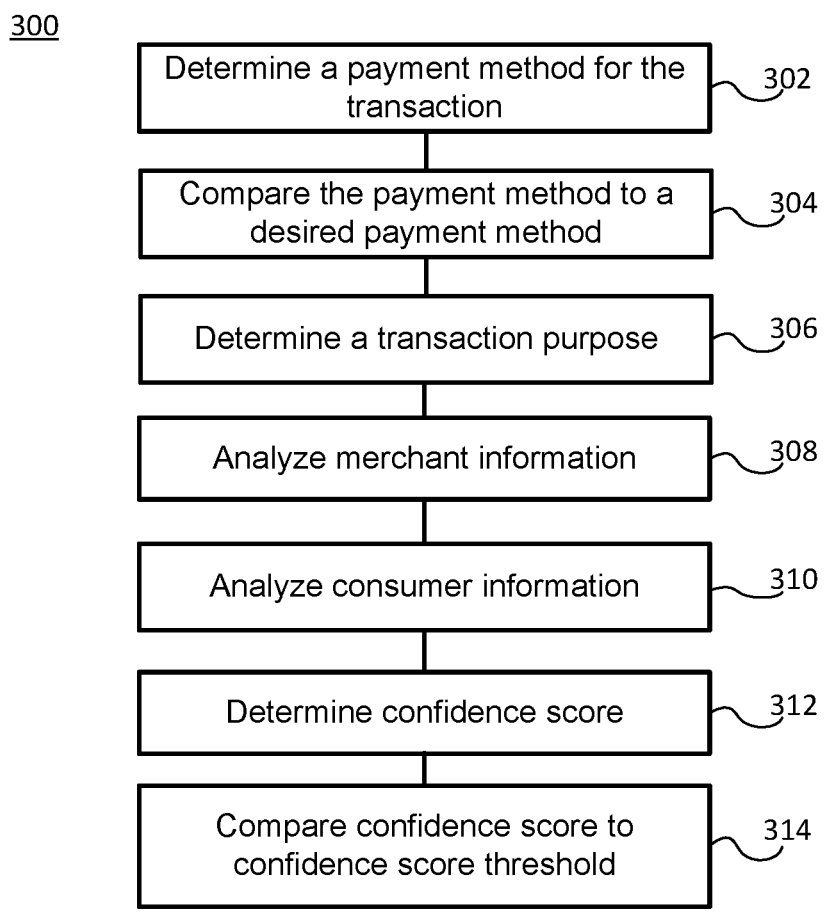
FIG. 3 depicts an exemplary method for detecting a leakage event, in accordance with various embodiments.

Referring now to FIGS. 2-3 the process flows and screenshots depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and user interface elements depicted in FIGS. 2-3, but also to the various system components as described above with reference to FIG. 1. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below. Unless otherwise specifically noted, articles depicted in the drawings are not necessarily drawn to scale.

With additional reference to FIG. 2, which depicts a method 200 for utilizing a leakage detection system 100 in order to detect leakage events, and allow the associated company to take appropriate action to address the detected leakage. The user may indicate to leakage analysis system 150 any time period during which transaction history may be evaluated to detect leakage events (e.g., by entering a start date and/or time and an end date and/or time). In various embodiments, leakage analysis system 150 may receive a subset or full transaction history (step 202) associated with a company from transaction database 140. The transaction history may comprise transaction information for a plurality of transactions to which employees of the company were a party. The transaction history from transaction database 140 may originate from the transaction account issuer associated with leakage analysis system 150 and/or an external source, such as a system collecting claim information from employees seeking reimbursement from the company for personally-incurred company expenses. For example, an employee seeking reimbursement from the company may enter the transaction information for a transaction (e.g., a consumer identifier and/or other consumer information, transaction account (or other payment method), merchant identifier and/or merchant information, transaction date, transaction time, transaction location, transaction amount, transaction purpose, or the like) into a system external to system 100. System 100, or any components comprised therein, may be in electronic communication with such an external system (e.g., via integration through an application programming interface), and obtain the information entered into the external system by the employee. Leakage analysis system 150 may also be applied to individual or groups of consumers (i.e., employees of the company), such as a certain department or team within a company. Each transaction in the transaction history may have an associated consumer and consumer identifier, so the user of leakage analysis system 150 may input consumer identifiers of the employees whose transaction history will be analyzed. For example, an individual employee or group of employees may participate in relatively more company transactions or have more business expenses than other employees or groups, so the transaction history of those employees may be analyzed because they have a greater likelihood of leakage, or leakage they cause may have a greater impact on the company.

Leakage analysis system 150 may analyze the transaction information (step 204) received from transaction database 140, and detect one or more leakage events (step 206) associated with one or more transactions represented by the received transaction information.

A leakage event may be caused by one or more transaction characteristics, merchant characteristics, consumer characteristics, or the like, which leakage analysis system 150 may detect. With additional reference to FIG. 3 depicting a method 300 for detecting a leakage event, as discussed herein, a leakage event may be the result of an employee completing a transaction without using the desired payment method (e.g., a transaction instrument issued by the transaction account issuer associated with the company). Accordingly, leakage analysis system 150 may detect and determine a payment method (step 302) for the transaction(s) and associated transaction information. For example, leakage analysis system 150 may scan transaction information for a payment method indicator to identify the payment method. Leakage analysis system 150 may have various payment method indicators stored therein or elsewhere in system 100, such that leakage analysis system 150 may match a detected payment method indicator from the analyzed transaction information with a stored payment method indicator. Such a match may result in identification of the payment method associated with a transaction. In various embodiments, leakage analysis system 150 may identify a transaction account issuer as the payment method by identifying a transaction instrument or transaction account associated with the transaction account issuer used in the transaction. In various embodiments, leakage analysis system 150 may identify the payment method by determining the payment method type (e.g., via a credit payment instrument, a debit payment instrument, cash, reward points, or the like) in the transaction information associated with a transaction. For example, leakage analysis system 150 may identify that the transaction was completed with cash, frequent flyer miles, reward points, a credit or debit transaction instrument (e.g., credit or debit card), and/or the like. In various embodiments, the transaction information for the analyzed transaction may list the payment method, for example, as provided by a transaction account issuer or merchant system 130 in the transaction description, or as entered by an employee seeking reimbursement for the transaction. In such embodiments, leakage analysis system 150 may identify the payment method by locating the listed payment method in the transaction information.

In response to determining the payment method for the transaction, leakage analysis system 150 may compare the determined payment method to a desired payment method (step 304). For example, a company (whose transaction history may be being analyzed by leakage analysis system 150) may have a policy that business transactions should be paid for by a certain payment method (i.e., the desired payment method), for example, by using a payment instrument from a certain payment account issuer so the company receives benefits for using the payment instrument. Therefore, leakage analysis system 150 may comprise the desired payment method as a reference to determine whether the desired payment method was used in a transaction being analyzed by leakage analysis system 150. Accordingly, leakage analysis system 150 may compare the determined payment method to the desired payment method (step 304). In response to a match, leakage analysis system 150 determines that there was no leakage event. For transactions involving the desired payment method, leakage analysis system 150 may not analyze the transaction information further. In response to the determined payment method and the desired payment method differing, leakage analysis system 150 may detect a leakage event, because the desired payment method was not utilized. In response, leakage analysis system 150 may analyze the transaction and associated transaction information further to determine a cause of the leakage event. In response to a leakage event being detected, leakage analysis system 150 may generate an action item to address the situation to have the desired payment method used in business transactions, as discussed further herein.

The transactions of interest, for which leakage analysis system 150 may analyze the associated transaction information, may be business transactions or business expenses (e.g., transactions conducted by an employee as part of their employment and/or on behalf of the company). That is, a leakage event may result from business transactions, because those are the transactions governed by a company's spending policy. Therefore, leakage analysis system 150 may determine transactions of interest by determining a transaction purpose (step 306) associated with an analyzed transaction. A transaction purpose may be detected by leakage analysis system 150 analyzing the transaction information for a transaction purpose indicator. For example, transactions related to business travel and/or entertainment may be detected (e.g., transactions related to air travel, ground travel, lodging, and/or food and beverage). Leakage analysis system 150 may detect a merchant identifier indicating that the transaction purpose is related to business travel and/or entertainment. For example, a merchant identifier comprised in the transaction information for a transaction may be an air or ground transportation merchant, indicating to leakage analysis system 150 that the transaction purpose was a business purpose. As another example, if the merchant information and/or merchant identifier associated with the transaction identifies a merchant that is not otherwise transacted with for business purposes (e.g., a clothing store, grocery store, etc.), leakage analysis system 150 may identify the transaction purpose as personal. As yet another example, leakage analysis system 150 may detect the purpose of a transaction as a business-to-business transaction (which may be identified as a business purpose). An employee of a company may be transacting on behalf of the company with a merchant (e.g., a supplier) to acquire, for example, office supplies or other products/services for the company. Leakage analysis system 150 may detect that the merchant transacted with is a product or service provider that provides products/services to the company (e.g., leakage analysis system 150 may detect that an employee would not make a personal transaction with the company, and/or for the amount or product/services sold), and therefore, leakage analysis system 150 may identify the transaction purpose as a business purpose.

Other transaction characteristics may indicate the transaction purpose. For example, leakage analysis system 150 may identify a time stamp in the transaction information for a transaction. The time stamp may reflect the date and time of day the transaction was conducted.

As another example of leakage analysis system 150 determining a transaction purpose (i.e., whether the transaction is business-related or personal), a business trip may be identified, because the transactions related to travel expenses may be business transactions. A business trip may be detected by determining a first day and last day of the business trip. Leakage analysis system 150 may analyze geographic locations of pairs of consecutive transactions in the transaction history received by leakage analysis system 150, and identify two consecutive transactions having distant geographic locations. That is, if a first transaction has a geographic location that is greater than a predetermined travel distance (i.e., a distance between two geographic locations that is of sufficient distance to indicate a business trip, such as 50 or 100 miles) from the geographic location of a second transaction, that is a subsequent, consecutive transaction to the first transaction, such a distance between two transactions indicates a business trip, and leakage analysis system 150 may recognize the same. Additionally, the first day of a business trip may be determined based on the first transaction of a pair of transactions having a geographic location that is deemed a home location for the associated consumer, and the second being a predetermined distance from the home location. Similarly, a last day of the business trip may be determined by identifying a pair of consecutive transactions (subsequent to the two transactions analyzed to determine the first day of the business trip), again, having associated geographic locations that are greater than a predetermined travel distance from one another. The geographic location of the second transaction of the pair of transactions may be a home location for the associated consumer, indicating the end of the business trip (i.e., the last day). In various embodiments, ticket information for air travel or ground travel, and/or lodging information for a reservation, may list the first and last days of the business trip, which leakage analysis system 150 may identify. Transactions during a business trip may be determined to have a business purpose, and therefore, may be transactions of interest to be analyzed by leakage analysis system 150.

In various embodiments, leakage analysis system 150 may detect a transaction purpose, for example, from the transaction description received from a transaction account issuer whose transaction account was used to complete the transaction, or from a submitted transaction purpose from the employee/consumer.

In various embodiments, determining the transaction purposes for the transactions reflected in the received transaction history may take place before a detection of a leakage event. That is, leakage analysis system 150 may determine whether each transaction reflected in the associated transaction information was for a business purpose or a personal expense. In various embodiments, in response to a transaction having a business purpose, the transaction may be flagged by leakage analysis system 150 for analysis. In response to the transaction not having a business purpose (e.g., a personal transaction), such a transaction may not be marked for analysis by leakage analysis system 150, or may be otherwise marked as not a leakage event. In various embodiments, determining the transaction purpose of a transaction may take place before or after determining the payment method for the transaction. In various embodiments, leakage analysis system 150 may detect a leakage event (step 206) in response to leakage analysis system 150 determining the transaction purpose (step 306) for a transaction to be business and the payment method differing from the desired payment method (relating to steps 302 and 304). In response, leakage analysis system 150 may generate an action item to resolve the leakage event such that the desired payment method is used in such transactions, as discussed herein.

In various embodiments, as part of method 300, leakage analysis system 150 may analyze merchant information (step 308) comprised in the transaction information associated with a transaction. Merchant information may comprise a merchant identifier (e.g., a merchant name, identification number, etc.), a merchant type, geographic location, physical address, email address, telephone number, account number, billing number, and/or the like. In various embodiments, the merchant information may be received as part of the transaction history (stored in transaction database 140) from the transaction account issuer in instances in which the transaction was conducted with a transaction instrument such as a credit or debit card. In various embodiments, the merchant information may be entered or otherwise provided by the employee who conducted the information (e.g., the employee manually enters the merchant information). However, in various embodiments, an employee or other provider of the merchant and/or transaction information may provide inadequate information, or insufficient information to identify the merchant participating in the analyzed transaction.

In various embodiments, as part of analyzing the merchant information, leakage analysis system 150 may enhance or enrich the merchant and/or transaction information associated with the transaction of interest. For example, in response to certain information (e.g., a merchant identifier) missing, leakage analysis system 150 may match other pieces of merchant information with stored or previously analyzed merchant information. In response to other merchant information (which is missing a merchant identifier) associated with a merchant in a transaction of interest matching stored or previously analyzed merchant information, leakage analysis system 150 may be able to fill in the missing merchant information (e.g., the merchant identifier). For example, if the source of the merchant information (e.g., the employee or the transaction account issuer) provided a physical address, phone number, and/or other information, leakage analysis system 150 may match one or more pieces of the merchant information present with previously analyzed and/or stored merchant information, and identify that such information is associated with a certain merchant identifier or name. Accordingly, leakage analysis system 150 may fill in the merchant identifier based on the other or surrounding merchant information, thus identifying the merchant in the transaction. Leakage analysis system 150 may similarly be configured to fill in other pieces of missing merchant information (or any other transaction information). In various embodiments, leakage analysis system 150 may be capable of accurately determining and/or populating merchant names (or other merchant identifiers) by detecting, analyzing, or otherwise using a phonetic representation of the merchant name. Along similarly lines, leakage analysis system 150 may enhance or enrich merchant and/or transaction information by translating at least a portion of the received transaction information. For example, if a merchant identifier (e.g., a merchant name) is in a language that is not the primary language used by leakage analysis system 150, leakage analysis system 150 may translate at least a portion of the merchant identifier (the portion that is in another language), such that the merchant/transaction information is in the primary language to allow matching with transaction information stored in leakage analysis system 150.

In various embodiments, as part of analyzing the merchant information (step 308), leakage analysis system 150 may determine the adequacy (or inadequacy) of the merchant information to detect a leakage event. For example, if leakage analysis system 150 is unable to identify the merchant (e.g., the merchant identifier is missing and/or cannot be discerned based on other provided merchant information), or the merchant information is missing all together from the transaction information, leakage analysis system 150 may determine that the merchant information is inadequate. In response, leakage analysis system 150 may detect a leakage event because leakage analysis system 150 may be unable to accurately determine a leakage event without the identity of the merchant involved in the transaction. In response to such a leakage event being detected, leakage analysis system 150 may generate an action item, for example, instructing the company (the user of system 100 and/or leakage analysis system 150) to instruct the employee(s) involved in the analyzed transaction, or all employees, about the correct and complete reporting and providing of transaction information when seeking reimbursement for business expenses. The action item may be displayed on display screen 122 of web client 120.

In response to determining the adequacy of the merchant information (e.g., leakage analysis system 150 detects and/or discerns the merchant identifier for the merchant involved in the transaction being analyzed), leakage analysis system 150 may identify the merchant involved in the transaction being analyzed. Leakage analysis system 150 may identify the merchant by matching the merchant identifier identified in or discerned from the transaction information with a stored merchant identifier stored in transaction database 140 and/or leakage analysis system 150. The stored merchant identifier may be associated with a merchant and the associated stored merchant information, such that the matching between the identified merchant identifier and the stored merchant identifier results in the identification of the relevant merchant and merchant information.

In response to identifying the merchant involved in the transaction being analyzed by leakage analysis system 150, leakage analysis system 150 may determine if the identified merchant accepts the desired payment method. For example, leakage analysis system 150 may determine if the transaction history associated with the merchant (i.e., the transaction information associated with the merchant's past transactions) has any transactions in which the payment method comprises the desired payment method. In various embodiments, leakage analysis system 150 may use fuzzy matching algorithms to match merchant information with the transaction information associated with the merchant's past transactions. Furthermore, leakage analysis system 150 may use neural network-based unsupervised machine learning algorithms (e.g., word2vec) to further improve the matching discussed above. If so, leakage analysis system 150 may determine that the merchant accepts the desired payment method. In response to the payment method of the analyzed transaction differing from the desired payment method, leakage analysis system 150 may determine that the analyzed transaction is a leakage event because the merchant accepts the desired payment method, but the employee did not use the desired payment method. In response, leakage analysis system 150 may generate an action item to address such a situation, so that the desired payment method is utilized in similar transactions (e.g., by suggesting the issuance of a transaction account and/or transaction instrument to the consumer involved in the analyzed transaction allowing use of the desired payment method, providing further instruction on how to comply with company policy (e.g., use the desired payment method for business transactions), providing incentives to employees to use the desired payment method, and/or the like).

If leakage analysis system 150 determines that the merchant involved in the analyzed transaction does not have any transactions in its transaction history involving the desired payment method, leakage analysis system 150 may determine that the merchant does not accept the desired payment method. In various embodiments, in response, leakage analysis system 150, may determine a leakage event because the transaction account issuer associated with the desired payment method does not have a business relationship with the merchant. In response, in various embodiments, leakage analysis system 150 may generate an action item, and present the action item to the transaction account issuer associated with leakage analysis system 150 and/or the desired payment method, and/or the company, to attempt to onboard the merchant to accept the desired payment method.

In various embodiments, a merchant may be on an override list for leakage analysis system 150, which lists merchants that do not show prior transactions involving the desired payment method, but despite this, have been previously determined to accept the desired payment method. Therefore, in response to the merchant involved in the analyzed transaction not having any transactions in its transaction history involving the desired payment method, leakage analysis system 150 may determine if the merchant is on the override list. If so, leakage analysis system 150 may determine that the merchant accepts the desired payment method, which may result in the detection of a leakage event if the desired payment method was not used, as discussed above. In response, leakage analysis system 150 may generate an action item to address such as situation, so that the desired payment method is used in future transactions with the merchant. If the merchant is not on the override list, leakage analysis system 150 may determine that the merchant does not accept the desired payment method, and may determine a leakage event, as discussed above.

In instances in which the merchant in the analyzed transaction is identified (i.e., the merchant identifier and/or other merchant information are matched with a stored merchant identifier and/or stored merchant information), leakage analysis system 150 may determine a confidence score (step 312) for the match. The confidence score indicates the degree of the match between the analyzed information (the merchant information) and the stored information (the stored merchant information). For example, a confidence score may be between a value of zero and one, where a confidence score of one represents a perfect match. In various embodiments, the confidence score may be a string distance measured by any suitable string distance algorithms such as optimal string alignment, q-gram, cosine similarity, hamming, jaro-winkler, levenshtein, or the like. The result of a string distance calculation may be the confidence score discussed above, having a value between zero and 1. For example, the strings "John Doe" and "Doe Joohn" may have a calculated distance of 0.67.

In various embodiments, leakage analysis system 150 may comprise a confidence score threshold, which the confidence score associated with the matching merchant information must exceed in order for leakage analysis system 150 to proceed as having identified the merchant involved in the analyzed transaction. For example, using the confidence score scale of zero to one discussed above, say the confidence score threshold is 0.7. Therefore, any matches detected by leakage analysis system 150 between merchant information and stored merchant information must receive a confidence score of at least 0.7 in order for leakage analysis system 150 to determine that the match did, in fact, result in a merchant identification. Therefore, in response to determining a confidence score for the matching information, leakage analysis system 150 may compare the confidence score with the confidence score threshold (step 314). In response to the confidence score exceeding the confidence score threshold, leakage analysis system 150 will proceed with the identified merchant and associated merchant information. In response to the confidence score failing to meet or exceed the confidence score threshold, leakage analysis system 150 may determine that the merchant information provided with the transaction information is inadequate (a similar result as that discussed in relation to step 308 above involving the inability to identify the merchant). Accordingly, in various embodiments, steps 312 and 314 may take place before leakage analysis system 150 determines whether the identified merchant in the analyzed transaction accepts the desired payment method. It should be noted that the confidence score may be determined on any suitable scale (e.g., in which a higher or lower value indicates greater confidence in the match). Therefore, "meeting" or "exceeding" the confidence score threshold may mean that the determined confidence score is a confidence score indicating greater accuracy of the information match than that indicated by the confidence score threshold.

In response to the merchant being identified, leakage analysis system 150 may identify whether the merchant has previous transactions involving the desired payment method, or whether the merchant is registered to receive desired payment method. For example, leakage analysis system 150 may compare the identified merchant to a list of merchants registered or on-boarded with a transaction account issuer associated with the desired payment method. In response to a match, leakage analysis system 150 may determine that the merchant accepts the desired payment method, and therefore, a leakage event would occur as a result of the employee choosing not to, or being unable to, use the desired payment method. In response to the identified merchant failing to match a registered merchant on the list of merchants, leakage analysis system 150 may determine that the merchant does not accept the desired payment method, and therefore, a leakage event may occur as a result.

In various embodiments, detecting a leakage event may further or alternatively comprise analyzing consumer information (step 310) of the consumer (employee) involved in the analyzed transaction. Leakage analysis system 150 may analyze the consumer information (e.g., a consumer identifier, account identifier, or the like, comprised in the transaction information), by matching the consumer information comprised in the transaction information with stored consumer information in transaction database 140, leakage analysis system 150, or any other component internal or external to system 100. Such matching may comprise determining a confidence score and making sure the confidence score exceeds the confidence score threshold, as discussed in relation to the merchant information above and steps 312 and 314 of method 300. It should be noted that the determining of a confidence score and comparison of the same to a confidence score threshold may be applied to any information (e.g., any information with the analyzed transaction information). In response to a match between the consumer information comprised in the transaction information and the stored consumer information (and a confidence score exceeding the confidence score threshold), leakage analysis system 150 may identify the consumer and associated consumer profile(s) and/or transaction account(s). Leakage analysis system 150 may also identify the location, business unit or team, or other characteristics of the employee within the company, and may tailor analysis of a transaction involving the employee accordingly (e.g., some business units may conduct business transactions more regularly, or may have to conduct business transactions in a certain way with another merchant, etc.). In response, leakage analysis system 150 may determine whether a transaction account and/or transaction instrument has been issued to the consumer (employee) such that the employee may use the desired payment method in transactions.

In response to leakage analysis system 150 determining that the employee does have a transaction account and/or transaction instrument allowing the employee to utilize the desired payment method in transactions, leakage analysis system 150 may detect a leakage event in transactions in which the desired payment method is not used. The employee is not following company policy of conducting business transactions using the desired payment method. Such detection of a leakage event may also comprise determination by leakage analysis system 150 that the transaction was for business purposes and/or that the merchant accepts the desired payment method. In response, leakage analysis system 150 may generate and/or display an action item for the user of leakage analysis system 150 (the company) to instruct and/or incentivize the employee(s) involved in the analyzed transaction, or all employees, to use the desired payment method when conducting business transactions. The action item may also comprise suggestions like reward programs or other incentive systems to encourage the employees to use the desired payment method.

In response to leakage analysis system 150 determining that the employee does not have a transaction account and/or transaction instrument, leakage analysis system 150 may detect a leakage event because the employee does not have way to follow the company policy of using the desired payment method for business transactions. In response, leakage analysis system 150 may generate and/or display an action item for the user of leakage analysis system 150 (the company) or the transaction account issuer associated with the desired payment method, to issue the employee a transaction account and/or transaction instrument associated with the desired payment method.

In response to leakage analysis system 150 detecting a leakage event, leakage analysis system 150 may generate and display or transmit an action item for the company and/or transaction account issuer associated with the desired payment method to take to encourage or cause compliance with company policy of using the desired payment method for business transactions. The action items may comprise multiple actions, for example, to remind an employee to use the desire payment method and reinforce reporting transaction information so adequate transaction information (e.g., merchant information) is provided to leakage analysis system 150 for analysis.

In various embodiments, as discussed herein, leakage analysis system 150 may analyze the transaction history for a company (i.e., transaction information associated with a plurality of transactions, which are conducted by a plurality of employees in variety of transactions). In various embodiments, leakage analysis system 150 may provide (e.g., display) information to the company using leakage analysis system 150 showing, for example, the percentage of transactions resulting in a leakage event, the percentage of employees causing leakage events, the business units or groups of employees with higher or lower percentages of leakage events, or the like. That way, a company may gauge the level of compliance among employees with its policy to use the desired payment method, and compare it to its objective levels (e.g., less than 10% of business transactions resulting in leakage). Additionally, leakage analysis system 150 may be utilized to gauge the user company's spending compliance performance and/or leakage percentages (e.g., percentages of business transactions resulting in leakage events, and/or percentages of business transaction monetary amounts involved in leakage events) compared to industry peers. In various embodiments, leakage analysis system 150 may prioritize which employees involved in leakage events who should be addressed by the company and/or transaction account issuer associated with the desired payment method. Similarly, leakage analysis system 150 may display on display screen 122 of web client 120 the leakage events associated with certain employees or groups of employees (e.g., selected by the company or leakage analysis system 150). For example, leakage analysis system 150 may display the leakage events involving those employees having the most frequent business transactions, highest dollar amount business transactions (individually or aggregated), highest travel frequency, highest leakage event percentage relating to occurrences or monetary amount (percent of business transactions not using the desired payment method), highest dollar amount of leakage, and/or the like. Leakage analysis system 150 may analyze the transaction information over a certain time period, and may be able to determine and display employees who are repeatedly noncompliant with using the desired payment method, or monitor, determine, and/or display changes in behavior over time for an employee, for instance after taking action by the company to address detected leakage. In various embodiments, leakage analysis system 150 may calculate the benefits that the company would obtain if a certain individual employee, group of employees, or all employees followed the company policy of using the desired payment method for business transactions, and display the same to the company. That way, the company may choose where to address the leakage first (i.e., which employees), and have an idea of the resulting benefits to the company of doing so. Therefore, the company may strategically address the noncompliant spending behavior of its employees to, for example, maximize the possible benefit resulting from the correction of such spending behavior.

The systems and methods discussed herein improve the functioning of the computer. For example, by utilizing leakage analysis system 150, leakage events, and the specific reason(s) for leakage events, may be detected and reported from the transaction information associated with many transactions. The systems and method discussed herein are capable of processing large amounts of data (e.g., the transaction information for thousands of transactions conducted by employees of a company), producing results to improve a company's expenditures and employee spending behavior. Without system 100 and leakage analysis system 150, the analysis and results produced by leakage analysis system 150 would not be able to be efficiently attained, discussed above, and noncompliant company spending behavior may go undetected and/or unresolved for some time. Furthermore, a user (e.g., a company) of system 100 and/or leakage analysis system 150 may be presented with possible action items to address the detected leakage events that are specific to the cause of such leakage events. Even further, the user may receive information regarding which employee(s) have the most leakage events, the most money involved in leakage events, or other similar information, such that the user of system 100 and/or leakage analysis system 150 may prioritize taking action to remedy the leakage. Therefore, the company's response may be customized to maximize benefit in addressing leakage.

The disclosure and claims do not describe only a particular outcome of determining financial policy compliance and detecting leakage events, but the disclosure and claims include specific rules for implementing the outcome of detecting leakage events and that render information into a specific format that is then used and applied to create the desired results of detecting leakage events, as set forth in *McRO, Inc.* v. *Bandai Namco Games America Inc.* (Fed. Cir. case number 15-1080, Sep. 13, 2016). In other words, the outcome of detecting leakage events can be performed by many different types of rules and combinations of rules, and this disclosure includes various embodiments with specific rules. While the absence of complete preemption may not guarantee that a claim is eligible, the disclosure does not sufficiently preempt the field of detecting leakage events at all. The disclosure acts to narrow, confine, and otherwise tie down the disclosure so as not to cover the general abstract idea of just detecting leakage events. Significantly, other systems and methods exist for determining financial policy compliance and detecting leakage events, so it would be inappropriate to assert that the claimed invention preempts the field or monopolizes the basic tools of detecting leakage events. In other words, the disclosure will not prevent others from determining financial policy compliance and detecting leakage events, because other systems are already performing the functionality in different ways than the claimed invention. Moreover, the claimed invention includes an inventive concept that may be found in the non-conventional and non-generic arrangement of known, conventional pieces, in conformance with Bascom v. AT&T Mobility, 2015-1763 (Fed. Cir. 2016). The disclosure and claims go way beyond any conventionality of any one of the systems in that the interaction and synergy of the systems leads to additional functionality that is not provided by any one of the systems operating independently. The disclosure and claims may also include the interaction between multiple different systems, so the disclosure cannot be considered an implementation of a generic computer, or just "apply it" to an abstract process. The disclosure and claims may also be directed to improvements to software with a specific implementation of a solution to a problem in the software arts.

Systems, methods, and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy," "meet," "match," "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Terms and phrases similar to "associate" and/or "associating" may include tagging, flagging, correlating, using a look-up table or any other method or system for indicating or creating a relationship between elements, such as, for example, (i) a transaction and (ii) transaction information. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input and/or any other method known in the art.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

The phrases consumer, customer, user, account holder, account affiliate, cardmember or the like shall include any person, entity, business, government organization, business, software, hardware, machine associated with a transaction account, who buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

In various embodiments, software may be stored in a computer program product and loaded into a computer system using removable storage drive, hard disk drive, or communications interface. The control logic (software), when executed by the processor, causes the processor to perform the functions of various embodiments as described herein. In various embodiments, hardware components may take the form of application specific integrated circuits (ASICs). Implementation of the hardware state machine so as to perform the functions described herein will be apparent to persons skilled in the relevant art(s).

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software, and hardware. Furthermore, the system may take the form of a computer program product on a computer-readable storage medium having computer-readable program code means embodied in the storage medium. Any suitable computer-readable storage medium may be utilized, including hard disks, CD-ROM, BLU-RAY DISC®, optical storage devices, magnetic storage devices, and/or the like.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® operating system, an APPLE® iOS operating system, a BLACKBERRY® company's operating system, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

The system and method may be described herein in terms of functional block components, screen shots, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT®, JAVASCRIPT® Object Notation (JSON), VBScript, Macromedia COLD FUSION, COBOL, MICROSOFT® company's Active Server Pages, assembly, PERL®, PHP, awk, PYTHON®, Visual Basic, SQL Stored Procedures, PL/SQL, any UNIX® shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT®, VBScript, or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

The system and method are described herein with reference to screen shots, block diagrams and flowchart illustrations of methods, apparatus, and computer program products according to various embodiments. It will be understood that each functional block of the block diagrams and the flowchart illustrations, and combinations of functional blocks in the block diagrams and flowchart illustrations, respectively, can be implemented by computer program instructions. As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS® applications, webpages, websites, web forms, prompts, etc. Practitioners will appreciate that the illustrated steps described herein may comprise in any number of configurations including the use of WINDOWS® applications, webpages, web forms, popup WINDOWS® applications, prompts, and the like. It should be further appreciated that the multiple steps as illustrated and described may be combined into single webpages and/or WINDOWS® applications but have been expanded for the sake of simplicity. In other cases, steps illustrated and described as single process steps may be separated into multiple webpages and/or WINDOWS® applications but have been combined for simplicity.

In various embodiments, the software elements of the system may also be implemented using NODE.JS® components. NODE.JS® programs may implement several modules to handle various core functionalities. For example, a package management module, such as NPM®, may be implemented as an open source library to aid in organizing the installation and management of third-party NODE.JS® programs. NODE.JS® programs may also implement a process manager, such as, for example, Parallel Multi-threaded Machine ("PM2"); a resource and performance monitoring tool, such as, for example, Node Application Metrics ("appmetrics"); a library module for building user interfaces, and/or any other suitable and/or desired module.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the internet server. Middleware may be configured to process transactions between the various components of an application server and any number of internal or external systems for any of the purposes disclosed herein. WEB SPHERE® MQ™ (formerly MQSeries) by IBM®, Inc. (Armonk, N.Y.) is an example of a commercially available middleware product. An Enterprise Service Bus ("ESB") application is another example of middleware.

The computers discussed herein may provide a suitable website or other internet-based graphical user interface which is accessible by users. In one embodiment, MICROSOFT® company's Internet Information Services (IIS), Transaction Server (MTS) service, and an SQL SERVER® database, are used in conjunction with MICROSOFT® operating systems, WINDOWS NT® web server software, SQL SERVER® database, and MICROSOFT® Commerce Server. Additionally, components such as ACCESS® software, SQL SERVER® database, ORACLE® software, SYBASE® software, INFORMIX® software, MYSQL® software, INTERBASE® software, etc., may be used to provide an Active Data Object (ADO) compliant database management system. In one embodiment, the APACHE® web server is used in conjunction with a LINUX® operating system, a MYSQL® database, and PERL®, PHP, Ruby, and/or PYTHON® programming languages.

For the sake of brevity, conventional data networking, application development, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, UNIX®, LINUX®, SOLARIS®, MACOS®, etc.) as well as various conventional support software and drivers typically associated with computers.

The present system or any part(s) or function(s) thereof may be implemented using hardware, software, or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by artificial intelligence (AI) or machine learning. Artificial intelligence may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. Useful machines for performing the various embodiments include general purpose digital computers or similar devices.

In various embodiments, the embodiments are directed toward one or more computer systems capable of carrying out the functionalities described herein. The computer system includes one or more processors. The processor is connected to a communication infrastructure (e.g., a communications bus, cross over bar, network, etc.). Various software embodiments are described in terms of this exemplary computer system. After reading this description, it will become apparent to a person skilled in the relevant art(s) how to implement various embodiments using other computer systems and/or architectures. The computer system can include a display interface that forwards graphics, text, and other data from the communication infrastructure (or from a frame buffer not shown) for display on a display unit.

The computer system also includes a main memory, such as random access memory (RAM), and may also include a secondary memory. The secondary memory may include, for example, a hard disk drive, a solid-state drive, and/or a removable storage drive. The removable storage drive reads from and/or writes to a removable storage unit in a well-known manner. As will be appreciated, the removable storage unit includes a computer usable storage medium having stored therein computer software and/or data.

In various embodiments, secondary memory may include other similar devices for allowing computer programs or other instructions to be loaded into a computer system. Such devices may include, for example, a removable storage unit and an interface. Examples of such may include a program cartridge and cartridge interface (such as that found in video game devices), a removable memory chip (such as an erasable programmable read only memory (EPROM), programmable read only memory (PROM)) and associated socket, or other removable storage units and interfaces, which allow software and data to be transferred from the removable storage unit to a computer system.

The terms "computer program medium," "computer usable medium," and "computer readable medium" are used to generally refer to media such as removable storage drive and a hard disk installed in hard disk drive. These computer program products provide software to a computer system.

The computer system may also include a communications interface. A communications interface allows software and data to be transferred between the computer system and external devices. Examples of communications interface may include a modem, a network interface (such as an Ethernet card), a communications port, a Personal Computer Memory Card International Association (PCMCIA) slot and card, etc. Software and data transferred via the communications interface are in the form of signals which may be electronic, electromagnetic, optical, or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

As used herein an "identifier" may be any suitable identifier that uniquely identifies an item, entity, or anything else involved in the systems and processes described herein. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16 bit integers.

System 100 contemplates uses in association with web services, utility computing, pervasive and individualized computing, security and identity solutions, autonomic computing, cloud computing, commodity computing, mobility and wireless solutions, open source, biometrics, grid computing, and/or mesh computing.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT® programs, active server pages (ASP), common gateway interface scripts (CGI), extensible markup language (XML), dynamic HTML, cascading style sheets (CSS), AJAX (Asynchronous JAVASCRIPT And XML) programs, helper applications, plug-ins, and the like. A server may include a web service that receives a request from a web server, the request including a URL and an IP address (192.168.1.1). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference. For example, representational state transfer (REST), or RESTful, web services may provide one way of enabling interoperability between applications.

Any databases discussed herein may include relational, hierarchical, graphical, blockchain, object-oriented structure, and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2® by IBM® (Armonk, N.Y.), various database products available from ORACLE® Corporation (Redwood Shores, Calif.), MICROSOFT ACCESS® or MICROSOFT SQL SERVER® by MICROSOFT® Corporation (Redmond, Wash.), MYSQL® by MySQL AB (Uppsala, Sweden), MONGODB®, Redis, APACHE CASSANDRA®, HBASE® by APACHE®, MapR-DB by the MAPR® corporation, or any other suitable database product. Moreover, any database may be organized in any suitable manner, for example, as data tables or lookup tables. Each record may be a single file, a series of files, a linked series of data fields, or any other data structure.

As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); data stored as Binary Large Object (BLOB); data stored as ungrouped data elements encoded using ISO/IEC 7816-6 data elements; data stored as ungrouped data elements encoded using ISO/IEC Abstract Syntax Notation (ASN.1) as in ISO/IEC 8824 and 8825; other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set.

As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

As used herein, the term "network" includes any cloud, cloud computing system, or electronic communications system or method which incorporates hardware and/or software components. Communication among the parties may be accomplished through any suitable communication channels, such as, for example, a telephone network, an extranet, an intranet, internet, point of interaction device (point of sale device, personal digital assistant (e.g., an IPHONE® device, a BLACKBERRY® device), cellular phone, kiosk, etc.), online communications, satellite communications, off-line communications, wireless communications, transponder communications, local area network (LAN), wide area network (WAN), virtual private network (VPN), networked or linked devices, keyboard, mouse, and/or any suitable communication or data input modality. Moreover, although the system is frequently described herein as being implemented with TCP/IP communications protocols, the system may also be implemented using IPX, APPLETALK® program, IP-6, NetBIOS, OSI, any tunneling protocol (e.g. IPsec, SSH, etc.), or any number of existing or future protocols. If the network is in the nature of a public network, such as the internet, it may be advantageous to presume the network to be insecure and open to eavesdroppers. Specific information related to the protocols, standards, and application software utilized in connection with the internet is generally known to those skilled in the art and, as such, need not be detailed herein. See, for example, DILIP NAIK, INTERNET STANDARDS AND PROTOCOLS (1998); JAVA® 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at www.csrc.nist.gov/publications/nistpubs/800-145/SP800-145 (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

Any communication, transmission, and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website, mobile application, or device (e.g., FACEBOOK®, YOUTUBE®, PANDORA®, APPLE TV®, MICROSOFT® XBOX®, ROKU®, AMAZON FIRE®, GOOGLE CHROMECAST™, SONY® PLAYSTATION®, NINTENDO® SWITCH®, etc.) a uniform resource locator ("URL"), a document (e.g., a MICROSOFT® Word™ or EXCEL®, an ADOBE® Portable Document Format (PDF) document, etc.), an "ebook," an "emagazine," an application or microapplication (as described herein), an SMS or other type of text message, an email, a FACEBOOK® message, a TWITTER® tweet, multimedia messaging services (MMS), and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network, and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, LINKEDIN®, INSTAGRAM®, PINTEREST®, TUMBLR®, REDDIT®, SNAPCHAT®, WHATSAPP®, FLICKR®, VK®, QZONE®, WECHAT®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

Each participant in a transaction, as discussed herein, may be equipped with a computing device in order to interact with system 100 and facilitate online commerce transactions. The consumer may have a computing unit in the form of a personal computer, although other types of computing units may be used including laptops, notebooks, hand held computers, set-top boxes, cellular telephones, touch-tone telephones, and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services, or information over any network having similar functionality described herein.

Phrases and terms similar to an "item" may include any good, service, information, experience, entertainment, data, offer, discount, rebate, points, virtual currency, content, access, rental, lease, contribution, account, credit, debit, benefit, right, reward, points, coupons, credits, monetary equivalent, anything of value, something of minimal or no value, monetary value, non-monetary value and/or the like. Moreover, the "transactions" or "purchases" discussed herein may be associated with an item. Furthermore, a "reward" may be an item.

Merchant system 130 and a bank computer (e.g., leakage analysis system 150) may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the AMERICAN EXPRESS® network, VISANET® network, VERIFONE® network, DISCOVER® card, PAYPAL® network, ApplePay network, GooglePay network, private networks (e.g., department store networks), and/or any other payment networks.

The electronic commerce system may be implemented at the customer and issuing bank (i.e., transaction account issuer). In an exemplary implementation, the electronic commerce system is implemented as computer software modules loaded onto the customer computer and the banking computing center. The merchant computer does not require any additional software to participate in the online commerce transactions supported by the online commerce system.

A record of charge (or "ROC") may comprise any transaction or transaction data (e.g., the transaction information associated with a transaction(s) obtained and/or provided by a transaction account issuer to transaction database 140 and/or leakage analysis system 150). The ROC may be a unique identifier associated with a transaction. Record of Charge (ROC) data includes important information and enhanced data. For example, a ROC may contain details such as location, merchant name or identifier, transaction amount, transaction date, account number, account security pin or code, account expiry date, and the like for the transaction. Such enhanced data increases the accuracy of matching the transaction data to the receipt data. Such enhanced ROC data is NOT equivalent to transaction entries from a banking statement or transaction account statement, which is very limited to basic data about a transaction. Furthermore, a ROC is provided by a different source, namely the ROC is provided by the merchant to the transaction processor. In that regard, the ROC is a unique identifier associated with a particular transaction. A ROC is often associated with a Summary of Charges (SOC). The ROCs and SOCs include information provided by the merchant to the transaction processor, and the ROCs and SOCs are used in the settlement process with the merchant. A transaction may, in various embodiments, be performed by a one or more members using a transaction account, such as a transaction account associated with a gift card, a debit card, a credit card, or the like.

A "consumer profile" or "consumer profile data" may comprise any information or data about a consumer that describes an attribute associated with the consumer (e.g., a preference, an interest, demographic information, personally identifying information, and the like).

The account number may be distributed and stored in any form of plastic, electronic, magnetic, radio frequency, wireless, audio, and/or optical device capable of transmitting or downloading data from itself to a second device. A consumer account number (e.g., for a transaction account and/or transaction instrument) may be, for example, a sixteen-digit account number, although each credit provider has its own numbering system, such as the fifteen-digit numbering system used by the AMERICAN EXPRESS® company. Each of the company's account numbers complies with that company's standardized format such that the company using a fifteen-digit format will generally use three-spaced sets of numbers, as represented by the number "0000 000000 00000." The first five to seven digits are reserved for processing purposes and identify the issuing bank, account type, etc. In this example, the last (fifteenth) digit is used as a sum check for the fifteen digit number. The intermediary eight-to-eleven digits are used to uniquely identify the consumer. A merchant account number may be, for example, any number or alpha-numeric characters that identify a particular merchant for purposes of account acceptance, account reconciliation, reporting, or the like.

In various embodiments, an account number may identify a consumer. In addition, in various embodiments, a consumer may be identified by a variety of identifiers, including, for example, an email address, a telephone number, a cookie id, a radio frequency identifier (RFID), a biometric, and the like.

The customer may be identified as a customer of interest to a merchant or company based on the customer's transaction history at the merchant, types of transactions, type of transaction account, frequency of transactions, number of transactions, lack of transactions, timing of transactions, transaction history at other merchants, demographic information, personal information (e.g., gender, race, religion), social media or any other online information, potential for transacting with the merchant, and/or any other factors.

The phrases consumer, customer, user, account holder, account affiliate, cardmember, or the like shall include any person, entity, business, government organization, business, software, hardware, or machine associated with a transaction account, who buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

As used herein, "issue a debit," "debit" or "debiting" refers to either causing the debiting of a stored value or prepaid card-type financial account, or causing the charging of a credit or charge card-type financial account, as applicable.

As used herein, the term "end user," "consumer," "customer," "cardmember," "business," or "merchant" may be used interchangeably with each other, and each shall mean any person, entity, government organization, business, machine, hardware, and/or software. A bank may be part of the system, but the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

Phrases and terms similar to a "party" may include any individual, consumer, customer, group, business, organization, government entity, transaction account issuer or processor (e.g., credit, charge, etc.), merchant, consortium of merchants, account holder, charitable organization, software, hardware, and/or any other type of entity. The terms "user," "consumer," "purchaser," and/or the plural form of these terms are used interchangeably throughout herein to refer to those persons or entities that are alleged to be authorized to use a transaction account.

Phrases and terms similar to "account," "account number," "account code", or "consumer account" as used herein, may include any device, code (e.g., one or more of an authorization/access code, personal identification number ("PIN"), internet code, other identification code, and/or the like), number, letter, symbol, digital certificate, smart chip, digital signal, analog signal, biometric, or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card, or an associated account.

Phrases and terms similar to "financial institution" or "transaction account issuer" may include any entity that offers transaction account services. Although often referred to as a "financial institution," the financial institution may represent any type of bank, lender, or other type of account issuing institution, such as credit card companies, card sponsoring companies, or third party issuers under contract with financial institutions. It is further noted that other participants may be involved in some phases of the transaction, such as an intermediary settlement institution.

Phrases and terms similar to "business" or "merchant" may be used interchangeably with each other and shall mean any person, entity, distributor system, software, and/or hardware that is a provider, broker, and/or any other entity in the distribution chain of goods or services. For example, a merchant may be a grocery store, a retail store, a travel agency, a service provider, an on-line merchant, or the like.

The terms "payment vehicle," "transaction account," "financial transaction instrument," "transaction instrument", or terms similar thereto, and/or the plural form of these terms may be used interchangeably throughout to refer to a financial instrument. Phrases and terms similar to "transaction account" may include any account that may be used to facilitate a financial transaction.

Phrases and terms similar to "merchant," "supplier" or "seller" may include any entity that receives payment or other consideration. For example, a supplier may request payment for goods sold to a buyer who holds an account with a transaction account issuer.

Phrases and terms similar to a "buyer" may include any entity that receives goods or services in exchange for consideration (e.g., financial payment). For example, a buyer may purchase, lease, rent, barter or otherwise obtain goods from a supplier and pay the supplier using a transaction account.

Phrases and terms similar to "internal data" may include any data a credit issuer (i.e., a transaction account issuer) possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer, and social security number. Consumer transactional data is any data pertaining to the particular transactions in which a consumer engages during any given time period. Consumer transactional data may include, for example, transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filing station in a particular postal code located at a particular cross section or address. Also, for example, transaction vendor/merchant location may include a particular web address, such as a Uniform Resource Locator ("URL"), an email address and/or an Internet Protocol ("IP") address for a vendor/merchant. Transaction vendor/merchant, and transaction vendor/merchant location may be associated with a particular consumer and further associated with sets of consumers. Consumer payment data includes any data pertaining to a consumer's history of paying debt obligations. Consumer payment data may include consumer payment dates, payment amounts, balance amount, and credit limit. Internal data may further comprise records of consumer service calls, complaints, requests for credit line increases, questions, and comments. A record of a consumer service call includes, for example, date of call, reason for call, and any transcript or summary of the actual call.

Phrases similar to a "payment processor" may include a company (e.g., a third party) appointed (e.g., by a merchant) to handle transactions. A payment processor may include an issuer, acquirer, authorizer, and/or any other system or entity involved in the transaction process. Payment processors may be broken down into two types: front-end and back-end. Front-end payment processors have connections to various transaction accounts and supply authorization and settlement services to the merchant banks' merchants. Back-end payment processors accept settlements from front-end payment processors and, via The Federal Reserve Bank, move money from an issuing bank to the merchant bank. In an operation that will usually take a few seconds, the payment processor will both check the details received by forwarding the details to the respective account's issuing bank or card association for verification, and may carry out a series of anti-fraud measures against the transaction. Additional parameters, including the account's country of issue and its previous payment history, may be used to gauge the probability of the transaction being approved. In response to the payment processor receiving confirmation that the transaction account details have been verified, the information may be relayed back to the merchant, who will then complete the payment transaction. In response to the verification being denied, the payment processor relays the information to the merchant, who may then decline the transaction.

The system may include or interface with any of the foregoing accounts, devices, and/or a transponder and reader (e.g., RFID reader) in RF communication with the transponder (which may include a fob), or communications between an initiator and a target enabled by near field communications (NFC). Typical devices may include, for example, a key ring, tag, card, cell phone, wristwatch, or any such form capable of being presented for interrogation. Moreover, the system, computing unit or device discussed herein may include a "pervasive computing device," which may include a traditionally non-computerized device that is embedded with a computing unit. Examples may include watches, internet-enabled home appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart card"); a fob having a transponder and an RFID reader; and/or near field communication (NFC) technologies. For more information regarding NFC, refer to the following specifications all of which are incorporated by reference herein: ISO/IEC 18092/ECMA-340, Near Field Communication Interface and Protocol-1 (NFCIP-1); ISO/IEC 21481/ECMA-352, Near Field Communication Interface and Protocol-2 (NFCIP-2); and EMV 4.2 available at www.emvco.com.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
   receiving, by a computing device of a transaction account issuer, a transaction history comprising transaction information associated with a plurality of transactions for an entity, wherein the transaction information involves transactions completed between employees of the entity and one or more merchants, wherein the transaction information is maintained in a transaction database of the transaction account issuer;
   designating, by the computing device, a type of data as a key field in transaction data records, wherein the transaction data records are associated with employees of an external company that is a customer of the transaction account issuer;
   linking, by the computing device, the transaction data records based on the type of data in key fields;
   searching for transaction history data within the linked transaction data records and the transaction information, using a neural network-based unsupervised machine learning algorithm by the computing device, the linked transaction data records and the transaction information associated with a transaction of the plurality of transactions;
   detecting, using the machine learning algorithm by the computing device, one or more leakage events associated with the transaction, the one or more leakage events comprising a first leakage event, wherein the first leakage event indicates a non-compliance of a spending rule of the entity by a participant in the transaction, wherein the spending rule specifies a desired payment method for the transaction, wherein the one or more detected leakage events are analyzed as inputs to improve performance of the machine learning algorithm via a closed loop of the machine learning algorithm;
   rendering, by the computing device, a network-based graphical user interface and loading the network-based graphical user interface into memory, wherein the network-based graphical user interface comprises one or more graphical user interface windows having one or more user-scrollable slider controls;
   outputting, by the computing device on a display device, one or more action items to resolve the one or more leakage events to the one or more graphical user interface windows having the one or more user-scrollable slider controls, wherein the one or more action items include onboarding a merchant to accept the desired payment method for the transaction or issuing a transaction instrument to the participant in the transaction allowing use of the desired payment method for the transaction;

performing, by the computing device, an analysis of a compliance level of the entity based on performing the detection of the one or more leakage events for the plurality of transactions;

comparing, by the computing device, the compliance level of the entity with one or more industry peers of the entity, wherein transaction information for the one or more industry peers is maintained in the transaction database of the transaction account issuer;

loading, by the computing device, the compliance level of the entity into memory; and outputting, to the network-based graphical user interface by the computing device on the display device, the compliance level of the entity that indicates an amount of employees of the entity that have been detected to participate in leakage events corresponding to the spending rule in comparison with the compliance level of the one or more industry peers of the entity.

2. The method of claim 1, wherein the detecting the one or more leakage events further comprises determining, by the computing device, a transaction purpose of the transaction, wherein the first leakage event is detected in further response to the transaction purpose being determined as a business purpose.

3. The method of claim 2, wherein the detecting the one or more leakage events comprises:

analyzing, by the computing device, merchant information associated with a merchant in the transaction, wherein the merchant information is comprised in the transaction information associated with the transaction;

matching, by the computing device, a merchant identifier comprised in the merchant information with stored merchant information associated with a stored merchant;

identifying, by the computing device, the merchant associated with the transaction in response to the matching; and determining, by the computing device, if the identified merchant accepts the desired payment method, wherein a second leakage event is detected in response to the identified merchant accepting or not accepting the desired payment method.

4. The method of claim 3, wherein the detecting the one or more leakage events further comprises:

determining, by the computing device, a confidence score in response to the matching the merchant identifier with stored merchant information using string distance calculations; and comparing, by the computing device, the confidence score to a confidence score threshold, wherein the identifying the merchant associated with the transactions is in response to the confidence score meeting or exceeding the confidence score threshold.

5. The method of claim 3, wherein the analyzing the merchant information comprises:

determining, by the computing device, accurate merchant information by at least one of translating at least a portion of a merchant name or filling in missing merchant information based on surrounding merchant information within the merchant information.

6. The method of claim 1, wherein the detecting the one or more leakage events further comprises:

analyzing, by the computing device, consumer information associated with a consumer in the transaction, wherein the consumer information is comprised in the transaction information associated with the transaction;

matching, by the computing device, a consumer identifier comprised in the consumer information with stored consumer information associated with a stored consumer;

identifying, by the computing device, the consumer associated with the transaction; and determining, by the computing device, if the consumer has been issued a desired payment instrument to conduct the desired payment method to complete transactions, wherein a third leakage event is detected further in response to at least one of consumer not having been issued the desired payment instrument, or possessing the desired payment instrument.

7. An article of manufacture including a non-transitory, tangible computer readable memory having instructions stored thereon that, in response to execution by a processor, cause the processor to perform operations comprising:

receiving a transaction history comprising transaction information associated with a plurality of transactions for an entity, wherein the transaction information involves transactions completed between employees of the entity and one or more merchants, wherein the transaction information is maintained in a transaction database of a transaction account issuer;

designating a type of data as a key field in transaction data records, wherein the transaction data records are associated with employees of an external company that is a customer of the transaction account issuer;

linking the transaction data records based on the type of data in key fields;

searching for transaction history data within the linked transaction data records and the transaction information, using a neural network-based unsupervised machine learning algorithm, the linked transaction data records and the transaction information associated with a transaction of the plurality of transactions;

detecting, using the machine learning algorithm, one or more leakage events associated with the transaction, the one or more leakage events comprising a first leakage event, wherein the first leakage event indicates a non-compliance of a spending rule of the entity by a participant in the transaction, wherein the spending rule specifies a desired payment method for the transaction, wherein the one or more detected leakage events are analyzed as inputs to improve performance of the machine learning algorithm via a closed loop of the machine learning algorithm;

rendering a network-based graphical user interface and loading the network-based graphical user interface into memory, wherein the network-based graphical user interface comprises one or more graphical user interface windows having one or more user-scrollable slider controls;

outputting, to a display device, one or more action items to resolve the one or more leakage events to the one or more graphical user interface windows having the one or more user-scrollable slider controls, wherein the one or more action items include onboarding a merchant to accept the desired payment method for the transaction or issuing a transaction instrument to the participant in the transaction allowing use of the desired payment method for the transaction;

performing an analysis of a compliance level of the entity based on performing the detection of the one or more leakage events for the plurality of transactions;

comparing the compliance level of the entity with one or more industry peers of the entity, wherein transaction information for the one or more industry peers is maintained in the transaction database of the transaction account issuer;

loading the compliance level of the entity into memory; and outputting, to the network-based graphical user interface on the display device, the compliance level of the entity that indicates an amount of employees that have been detected to participate in leakage events corresponding to the spending rule in comparison with the compliance level of the one or more industry peers of the entity.

8. The article of claim 7, wherein the detecting the one or more leakage events further comprises determining a transaction purpose of the transaction, wherein the first leakage event is detected in further response to the transaction purpose being determined as a business purpose.

9. The article of claim 8, wherein the detecting the one or more leakage events comprises:

analyzing merchant information associated with a merchant in the transaction, wherein the merchant information is comprised in the transaction information associated with the transaction;

matching a merchant identifier comprised in the merchant information with stored merchant information associated with a stored merchant;

identifying the merchant associated with the transaction in response to the matching; and determining if the identified merchant accepts the desired payment method, wherein a second leakage event is detected in response to the identified merchant accepting or not accepting the desired payment method.

10. The article of claim 9, wherein the detecting the one or more leakage events further comprises:

determining a confidence score in response to the matching the merchant identifier with stored merchant information using a string distance calculations; and comparing the confidence score to a confidence score threshold, wherein the identifying the merchant associated with the transactions is in response to the confidence score meeting or exceeding the confidence score threshold.

11. The article of claim 9, wherein the analyzing the merchant information comprises:

determining accurate merchant information by at least one of translating at least a portion of a merchant name or filling in missing merchant information based on surrounding merchant information within the merchant information.

12. The article of claim 7, wherein the detecting the one or more leakage events further comprises:

analyzing consumer information associated with a consumer in the transaction, wherein the consumer information is comprised in the transaction information associated with the transaction;

matching a consumer identifier comprised in the consumer information with stored consumer information associated with a stored consumer;

identifying the consumer associated with the transaction; and determining if the consumer has been issued a desired payment instrument to conduct the desired payment method to complete transactions, wherein a third leakage event is detected further in response to at least one of consumer not having been issued the desired payment instrument, or possessing the desired payment instrument.

13. A system comprising:

a computing device comprising a processor; and a tangible, non-transitory memory configured to communicate with the processor, the tangible, non-transitory memory having instructions stored thereon that, in response to execution by the processor, cause the computing device to perform operations comprising:

receiving a transaction history comprising transaction information associated with a plurality of transactions for an entity, wherein the transaction information involves transactions completed between employees of the entity and one or more merchants, wherein the transaction information is maintained in a transaction database of a transaction account issuer;

designating a type of data as a key field in transaction data records, wherein the transaction data records are associated with employees of an external company that is a customer of the transaction account issuer;

linking the transaction data records based on the type of data in key fields;

searching for transaction history data within the linked transaction data records and the transaction information, using a neural network-based unsupervised machine learning algorithm, the linked transaction data records and the transaction information associated with a transaction of the plurality of transactions;

detecting, using the machine learning algorithm, one or more leakage events associated with the transaction, the one or more leakage events comprising a first leakage event, wherein the first leakage event indicates a non-compliance of a spending rule of the entity by a participant in the transaction, wherein the spending rule specifies a desired payment method for the transaction, wherein the one or more detected leakage events are analyzed as inputs to improve performance of the machine learning algorithm via a closed loop of the machine learning algorithm;

rendering a network-based graphical user interface and loading the network-based graphical user interface into memory, wherein the network-based graphical user interface comprises one or more graphical user interface windows having one or more user-scrollable slider controls;

outputting, to a display device, one or more action items to resolve the one or more leakage events to the one or more graphical user interface windows having the one or more user-scrollable slider controls, wherein the one or more action items include onboarding a merchant to accept the desired payment method for the transaction or issuing a transaction instrument to the participant in the transaction allowing use of the desired payment method for the transaction;

performing an analysis of a compliance level of the entity based on performing the detection of the one or more leakage events for the plurality of transactions;

comparing the compliance level of the entity with one or more industry peers of the entity, wherein transaction information for the one or more industry peers is maintained in the transaction database of the transaction account issuer;

loading the compliance level of the entity into memory; and outputting, to the network-based graphical user interface on the display device, the compliance level of the entity that indicates an amount of employees that have been detected to participate in leakage events corresponding to the spending rule in comparison with the compliance level of the one or more industry peers of the entity.

14. The system of claim 13, wherein the detecting the one or more leakage events further comprises determining a transaction purpose of the transaction, wherein the first leakage event is detected in further response to the transaction purpose being determined as a business purpose.

15. The system of claim 14, wherein the detecting the one or more leakage events comprises:

analyzing merchant information associated with a merchant in the transaction, wherein the merchant information is comprised in the transaction information associated with the transaction;

matching a merchant identifier comprised in the merchant information with stored merchant information associated with a stored merchant;

identifying the merchant associated with the transaction in response to the matching; and determining if the identified merchant accepts the desired payment method, wherein a second leakage event is detected in response to the identified merchant accepting or not accepting the desired payment method.

16. The system of claim 15, wherein the detecting the one or more leakage events further comprises:

determining a confidence score in response to the matching the merchant identifier with stored merchant information using a string distance calculation; and comparing the confidence score to a confidence score threshold, wherein the identifying the merchant associated with the transactions is in response to the confidence score meeting or exceeding the confidence score threshold.

17. The system of claim 13, wherein the detecting the one or more leakage events further comprises:

analyzing consumer information associated with a consumer in the transaction, wherein the consumer information is comprised in the transaction information associated with the transaction;

matching a consumer identifier comprised in the consumer information with stored consumer information associated with a stored consumer;

identifying the consumer associated with the transaction; and determining if the consumer has been issued a desired payment instrument to conduct the desired payment method to complete transactions, wherein a third leakage event is detected in response to at least one of consumer not having been issued the desired payment instrument, or possessing the desired payment instrument.

* * * * *